United States Patent [19]

Lapp et al.

[11] Patent Number: 5,219,290

[45] Date of Patent: Jun. 15, 1993

[54] TOOL FOR CONTROL OF A HAZARD FIGHTING OPERATION

[76] Inventors: Philip W. Lapp, 17400 SW. Brookman Rd., Sherwood, Oreg. 97140; John E. Bartlett, 9740 SW. Pembrook St., Tigard, Oreg. 97224

[21] Appl. No.: 777,030

[22] Filed: Oct. 16, 1991

[51] Int. Cl.$^5$ .................... G09B 19/00; G09B 29/00; B43L 1/00

[52] U.S. Cl. .................... 434/226; 434/413; 434/430

[58] Field of Search .............. 434/226, 413, 414, 430, 434/108

[56] References Cited

U.S. PATENT DOCUMENTS

| | | | |
|---|---|---|---|
| 3,224,128 | 12/1965 | Steward | 434/108 |
| 3,565,462 | 2/1971 | Gottlieb | 434/226 |
| 3,629,960 | 12/1971 | Roush | 434/430 |
| 3,968,573 | 7/1976 | Poliniere | 434/430 |
| 4,511,161 | 4/1985 | Gruner | 283/1 A |
| 4,795,348 | 1/1989 | Garthwaite | 434/112 |

Primary Examiner—Gene Mancene
Assistant Examiner—Cindy A. Cherichetti

Attorney, Agent, or Firm—Robert L. Harrington

[57] ABSTRACT

A tool for use by an incident commander for organizing, deploying and managing resource units assigned by the commander in a incident control operation. A carrying case including a variety of graphic displays and movable tags identifying regional resources. A first graphic contains the tags of potentially available resources for that operation. A second graphic to which the tags are moved upon the resources represented by the tags being assigned to that operation. A third graphic to which the tags are moved to identify tasks assigned to the specific units.

Additional graphic displays provide expansion of the incident organization determined by the size and severity of the incident. Graphic displays are segregated by area responsibility such as medical, finance, etc. A command graphic enables the expansion of the chain of command. In all cases, individuals having supervisory or management responsibility are identified and positioned within the chain of command. The graphic displays are assigned and arranged to enable overall review and instant awareness of the functions performed and the individual responsibilities for these functions.

9 Claims, 9 Drawing Sheets

STAGING AREA CHECK-IN/OUT BOARD

STAGING LOCATION:

| AGENCY | UNIT TYPE | UNIT I.D. | UNIT LEADER'S NAME | TOTAL PERSONNEL | TIME IN | INCIDENT ASSIGNMENT | TIME OUT |
|---|---|---|---|---|---|---|---|
| | | | | | | | |

FIG. 7

| DIVISION / GROUP / SECTOR UNIT CONTROL BOARD | | | |
|---|---|---|---|
| DIVISION | GROUP | SECTOR | |
| | | | |

| OBJECTIVE | RADIO FRQ. |
|---|---|
| | |

NOTES

| UNIT | ASSIGNED PERSONNEL |
|---|---|
| SUPERVISOR | |
| UNIT | ASSIGNED PERSONNEL |
| SUPERVISOR | |
| UNIT | ASSIGNED PERSONNEL |
| SUPERVISOR | |
| UNIT | ASSIGNED PERSONNEL |
| SUPERVISOR | |
| UNIT | ASSIGNED PERSONNEL |
| SUPERVISOR | |

PENS / PENCILS / FORMS

TOOL FOR CONTROL OF A HAZARD FIGHTING OPERATION

BACKGROUND INFORMATION

1. Field of the Invention

This invention relates to a method and tool for implementing a hazard fighting command system and in particular for organizing and tracking multiple units of hazard fighting personnel and equipment.

2. Background Information

Civil agencies such as city and county fire departments and other hazard controlling agencies need a flexible command structure to respond to many different situations. Command personnel of a fire department for example, must have the capability to respond to situations ranging from a small fire which can be controlled by a single unit of equipment and crew, to a large scale fire that may require many units that may include equipment and crews from different departments within an agency and even from different agencies. The basic organization and command line of an agency responding to an incident such as a fire department is essentially the same for all emergency incidents, small and large. An individual referred to as the incident commander is in charge to direct and manage the operation generally at the site and ultimately gains control of the incident and brings it to a conclusion. A small incident requiring only the deployment of one or two units is relatively uncomplicated. For a small incident the incident commander is generally the supervisor of the first unit to arrive at the scene and assumes the role of directing the units assigned to that site, assigning particular assignments to the units and corresponding crew members. The incident commander having only to manage and direct one or two units can do so without a great deal of organizational concern.

Large scale incidents that require multiple units of equipment and corresponding crews of personnel magnify the organizational concerns of the incident commander. The more equipment required and involved to combat an incident, the more complex the management. Each equipment unit called into service has personnel assigned to the unit and the incident commander assigns the unit and its corresponding crew to a task. The incident commander, makes the job assignment and it is the duty of the incident commander to keep track of the assignments. Additionally other agencies, both public and private may be employed and they too come under the overall organizational responsibilities of the incident commander.

In cases where multiple units and/or agencies are involved, the incident commander will necessarily have to keep notes of the assignments made since it is not feasible to rely on an individuals memory. Furthermore, such notes should enable assistants to refer to them and quickly determine their area of responsibility. Also, the command responsibilities may be transferred to a new incident commander who must be able to quickly decipher the organization that is in place. It is thus necessary to make an ongoing and standardized record of the organization as it is formed which is an objective of the present invention.

It is believed that in order for the incident commander to effectively manage numerous amounts of equipment and personnel involved in a serious incident such as a multi-alarm fire, the incident commander needs a tool that will provide ready information on each and any facet of the operation. The present invention provides a tool to aid the incident commander to effectively manage and direct the personnel and equipment involved.

BRIEF SUMMARY OF THE INVENTION

The preferred embodiment of the present invention utilizes a tool that incorporates two basic features. It includes an itemization listing of all equipment and personnel that may be made available to the incident commander. Such items of equipment and personnel are individually recorded on attachable/detachable magnetic tags preferably contained in a portable case or kit. It further includes an organization of graphics (charts) that are formatted to accommodate organizational expansion, i.e., as units are added. The graphics display and identify the assignments made by the incident commander.

In general, as units are assigned by an incident commander, the corresponding unit tags are removed from the itemization list and transferred to a staging graphic that identifies what is actually available to that incident commander. Other graphics are designed to include the functions that correspond to established incident management functions (for small and large incidents alike). As the incident commander determines the incident "needs", units and personnel are assigned to specific functions and/or tasks and are recorded by moving tags out of the staging area to the specific function located on the appropriate graphic display.

The graphic assignment is organized to handle small, medium or large to very complex incidents. The function portion of the graphic display enable the commander to "grow" his chain of command as the need dictates. This will be more clearly understood by reference to the detailed description which follows this summary.

Not specifically discussed in the above are numerous supplemental tools that may be provided to further facilitate the ability of the incident commander to organize, manage and control the emergency incident. Support kits may be provided to incident supervisors assigned to specific functional tasks. The kits include workbooks containing an I. D. vest, instructions applicable to that functional assignment, and a pen and note pad. The workbooks are preferably color coded to indicate what specific section the assignment relates to. Colored vests are also used for this purpose.

A further supplemental tool can be provided to all unit supervisors in the form of a highly portable hand held incident control board case used to start the incident management process. This control board case may not provide the full benefits of the principle command center case but it is formatted with graphics so as to enable an incident commander to transfer over to the principle command center case as desired.

Reference now to the drawings and the detailed description for a full understanding of the invention.

DESCRIPTION OF THE PREFERRED EMBODIMENT

Figure 1:
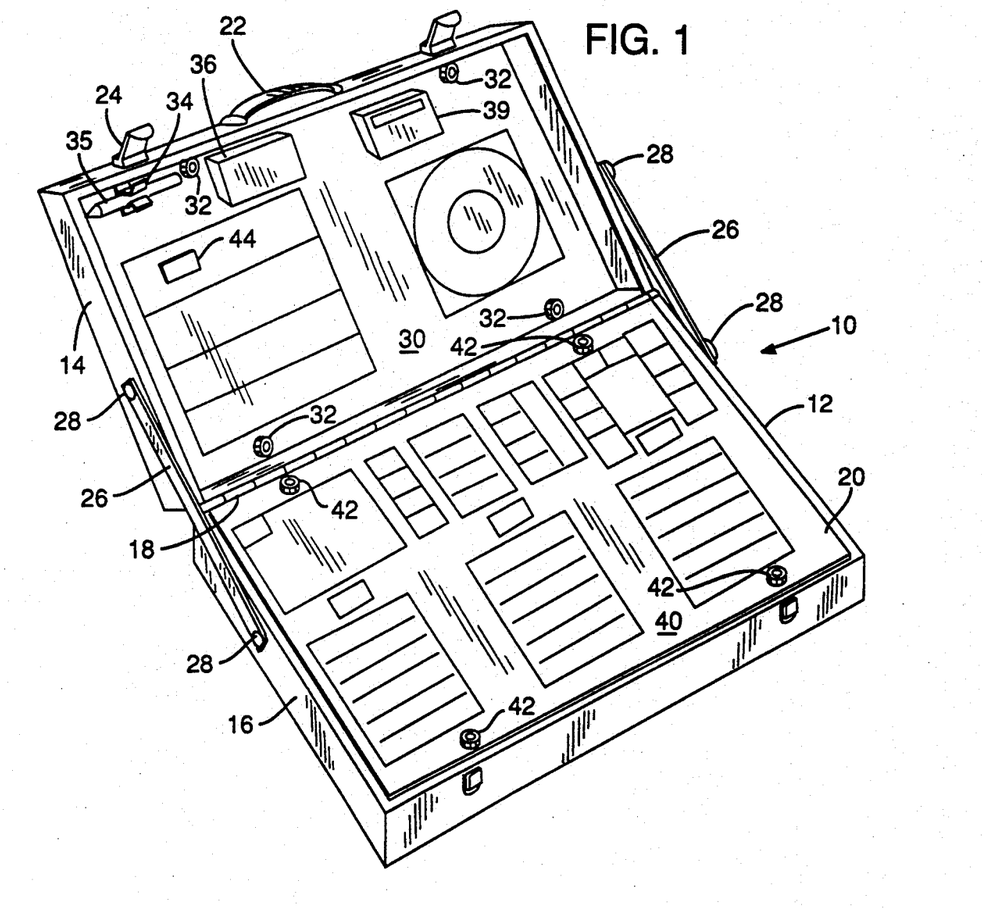
FIG. 1 is a perspective view of a portable case having the desired features of a incident management control center in accordance with the present invention.

Refer now to FIG. 1 of the drawings which illustrates a case 10 that functions as an organizational tool for an incident commander of a hazard area site such as the site of a fire. The case 10 is a portable unit and has formatted graphic displays and ancillary equipment that are utilized to organize and manage fire fighting units and other support personnel as required by the severity of the situation at the hazard area.

The case 10 is basically two rectangular boxes 14, 16 hinged together by a hinge 18 with box 14 designated as a top and box 16 designated as a base. A suggested size for the top 14 and base 16 is 17 inches by 25 inches by one inch. A panel 20 is fitted between the top 14 and base 16 and is also hinged by the hinge 18. The panel 20 acts as a cover for the base 16. The space under the panel 20 provides a storage compartment.

A conventional handle 22 for carrying the case 10 is attached to the outer edge of the top 14 and conventional latch mechanisms 24 are fitted to the top 14 and base 16 for securing the top to the base in a closed position. Flexible straps 26 of sufficient length are attached to the top 14 and base 16 at a distance from the hinge 18, as shown, to hold the top 14 open in a near vertical position when the base 16 is on a horizontal surface, i.e., the position of FIG. 1. The straps 26 are secured to the top 14 and base 16 by conventional snap fasteners 28 and therefore the straps 26 may be detached from the top 14 and/or the base 16 to permit the case 10 to open fully with the top 14 on the same plane as the base 16.

A template 30 preferably of a ferrous material that magnets will adhere to is removably attached to the interior surface of the top 14 and is retained by fasteners 32. The template 30 has formatted graphics imprinted on its surface and has a finish suited for marking with an erasable liquid type marker. The template 30 preferably has a clip 34 for holding a marker 35, a retainer (not shown) for securing an eraser 36, and an area for storing a combination timer and clock 39 with a magnetic back.

A template 40 preferably of a ferrous material that magnets will adhere to is attached to the panel 20 by conventional fasteners 42. The template 40 has formatted graphics imprinted on its surface and is suited for marking with an erasable liquid type marker (marker 35). The imprints, i.e., the graphics, on the templates 30 and 40 are designed to lay out a chain of command as will be explained.

Figure 2:
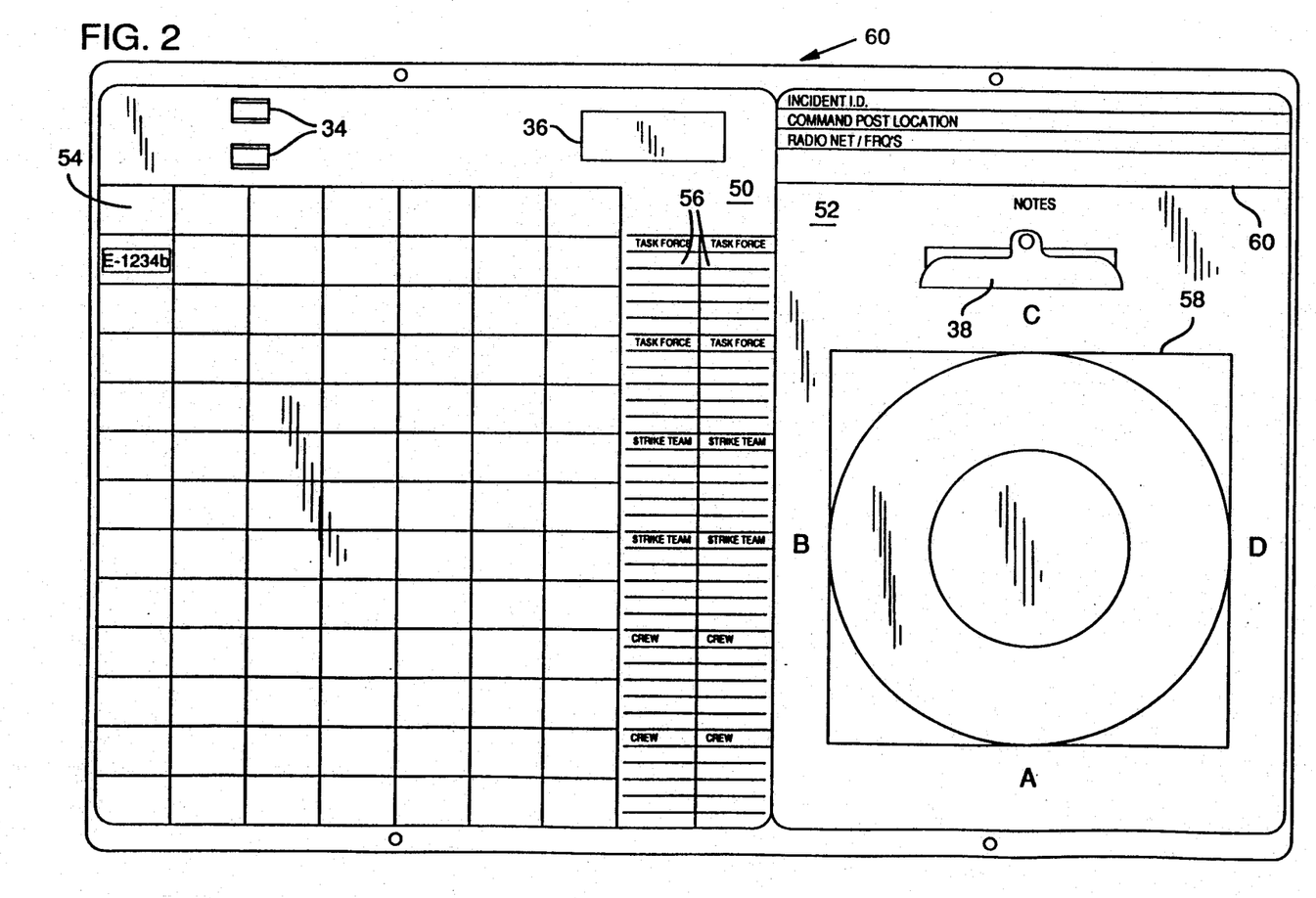
FIG. 2 is a plan view of the inside cover of the upper half of the case of FIG. 1.

Refer now to FIG. 2 which illustrates the imprint on the template 30 fitted to the top 14 of the case 10. The template 30 is a resource and information template and provides a visual display of regional resources that may be made available to the commander. It also includes a layout to provide pertinent information regarding the site. The template is divided into two basic graphics, a left graphic 50 of the resource and a right graphic 52 of the hazard area site.

The left graphic 50 of the template as viewed in FIG. 2 is arranged for a visual display of resources that may be made available such as the fire district's equipment and personnel units (often including units of neighboring districts), specialized task force teams, strike teams and reserve crews. The identifying reference of the resources may be written in rectangular spaces 54 or preferably indicated by magnetic tags 44 having engraved identifying logos. A fire engine, for example, normally stationed in a district b of the city may be identified by the logo E-1243b. All of the units that may be made available to the incident commander for any specific hazard and which may be called into service would be identified with their individual identification.

Twelve equal sized blocks 56 are provided in the left graphic 50 adjacent the printed rectangles 54. Each block has a heading, and in this embodiment, four of the blocks have headings of "Task Force", four have headings of "Strike Team" and four have headings of "Crew". Each block 56 has multiple spaces for listing personnel.

The right graphic 52 of the template 30, again as viewed in FIG. 2, includes an area graphic 58. The graphic 58 provides a means for mapping a building or an area of a site and is also suited for the overlay of an actual map of a site. The graphic 58 has an imprinted square with the sides of the square labeled A, B, C and D for reference. For example, A identifies the front of the building, C the back and B and D the left and right sides. As an aid, two concentric circles are printed on the template within the square. Adequate space is provided on each side of the square for adding notes, such as a street name or direction.

The upper portion of the right graphic 52 of the template 30 above the area graphic 58 has a section generally indicated by the numeral 60 for placing identifying information and other notes. The section 60 is divided into multiple lines with one line labeled "Incident I.D.", another line labeled "Command Post Location" and a third line labeled "Radio Net/Frq's". The area below the labeled lines of the section 60 has an area labeled "Notes". The upper portion of the right graphic thus provides an area for identifying the incident, listing the command post location and listing the radio frequencies to be used for the incident. Fire units may, for example, be assigned one or two frequencies and the police units another. The area designated notes is used for other information such as utilities supplied to the site or other pertinent information.

The template 30 is thus a resources listing and an information graphic for the incident commander.

Figure 3:
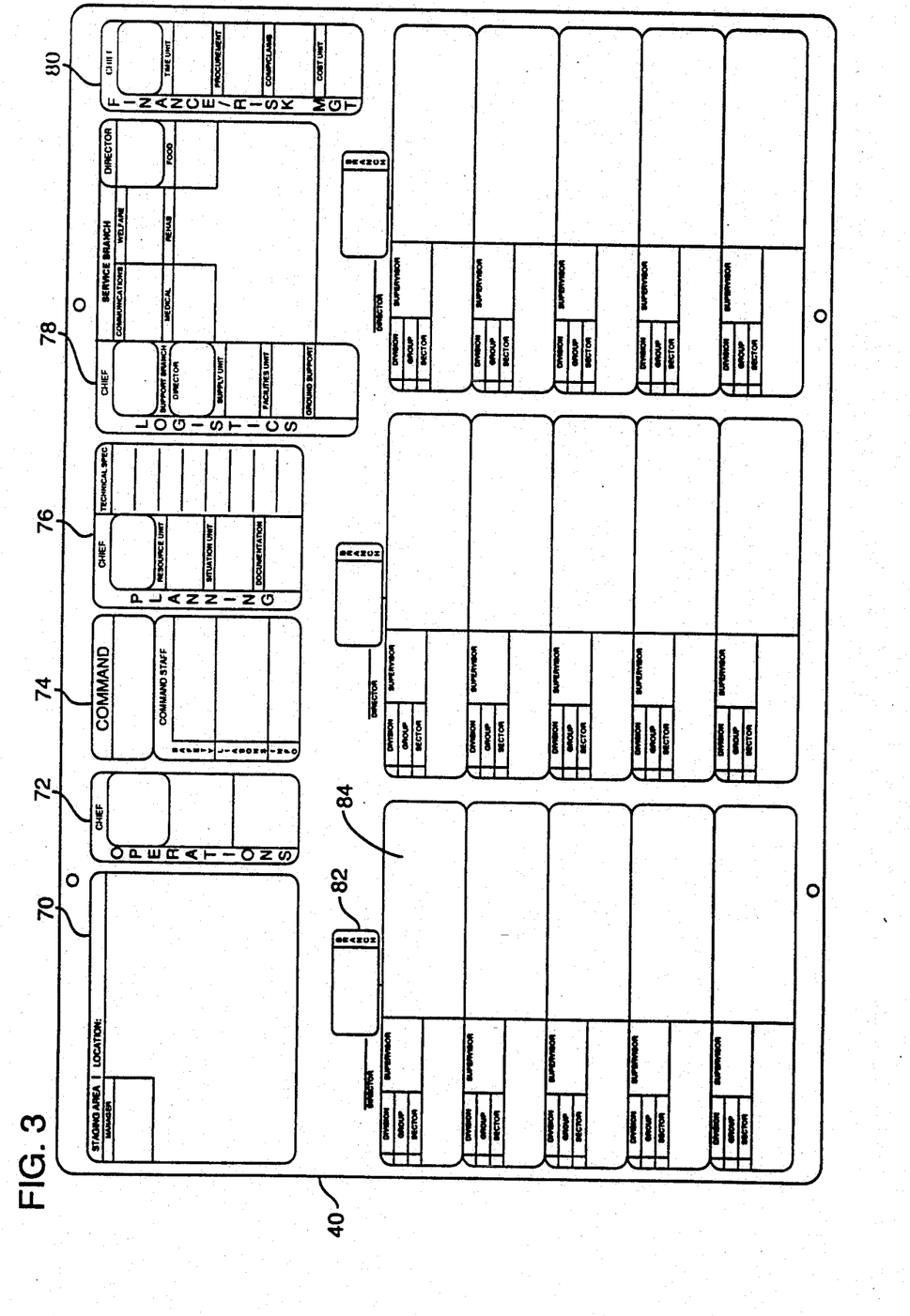
FIG. 3 is a plan view of the inside of the lower cover of the case of FIG. 1.

Refer now to FIG. 3 of the drawings which illustrates the template 40 fitted to the panel 20. The template 40 is imprinted with a format of organizational graphics and has a finish suited for erasable marking pens and/or the attaching of magnetic identification tags.

The format of the template 40 is divided into different graphics with each graphic having a designated purpose. The upper left graphic 70 of the template, as viewed in the figure is a staging area graphic. The staging area identifies the units that are assigned to the incident commander for that specific incident prior to being assigned to a specific function by the commander. Spaces are provided in the graphic and are titled "location" and "manager" to indicate the location of assigned units prior to function assignment, and to identify the manager of the staging function. As shown, the graphic 70 has space for placing magnetic tags identifying the units, or if a unit is not identified by a tag, writing in that equipment unit's identification.

Extended across the top of template 40, besides the staging area, are the various indicia for identifying the operation controllers. As will become apparent, these controllers may or may not be required as the graphic is designed to accommodate expansion from small to medium to large incidents as needed. An operations graphic 72 is divided into three spaces for assistant commanders or chiefs. The operations graphic thus enables the listing of supplemental command personnel assigned to direct collateral operations as will be explained.

Next to the operations graphic 72 is the command graphic 74. The command graphic 74 is the top of the command line and has three spaces for listing the incident commander and supporting staff, and includes spaces titled "Safety", "Liaison", and "Info" for the assignment of staff to the three categories of safety, liaison and information.

Next to the command graphic 74 is a planning graphic 76. It has a spaces titled "Chief", "Resource Unit", "Situation Unit" and "Documentation" and includes a column with multiple spaces titled "Technical Spec". These also are supplemental to the overall organization as would be involved in a large incident and which is known to those skilled in the art.

Adjacent the planning graphic 76 is a logistics graphic 78. The logistic graphic 78 has a space titled "Chief". The logistic graphic 78 is divided into a support branch and a service branch with each branch appropriately titled "Support Branch" and "Service Branch". The support branch of the graphic has spaces titled "Director", "Supply Unit", "Facilities Unit" and "Ground Support". The service branch of the logistics graphic 78 has a spaces titled "Director", "Communications", "Welfare", "Medical", "Rehab" and "Food". The "Rehab" space can accommodate multiple resource tags or the information may be written in the space to track units assigned to that area.

Adjacent the logistics graphic 78 is a finance/risk-/management graphic 80. The graphic 80 has a space titled "Chief" and also includes spaces titled "Time Unit", "Procurement", "Comp/Claims" and "Cost Unit". As previously indicated, all of the graphics can play a role in the extensive incident and that role will be further explained in the "Utilization" section.

The lower portion of the template 40 has three branch graphics 82. As seen in the figure, the branch graphics 82 have a space titled "Director" and a block for naming the branch. Each branch graphic 82 has multiple sub graphics 84 that have spaces titled "Supervisor", "Division", "Group" and "Sector" with a small box adjacent each title for checking off the appropriate designation. The sub graphics 84 include an area for inserting the unit numbers of the units assigned to the designated division, group or sector.

Figure 4:
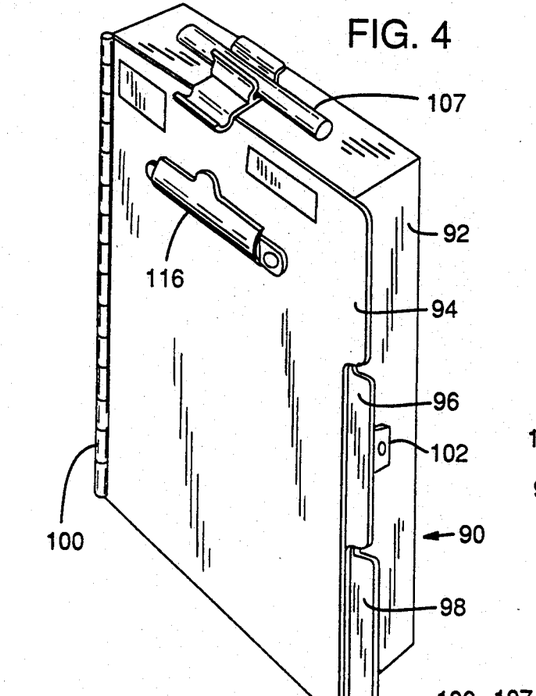
FIGS. 4 and 4A are perspective views of a portable case having starter kit in accordance with the invention.
Figure 4A:
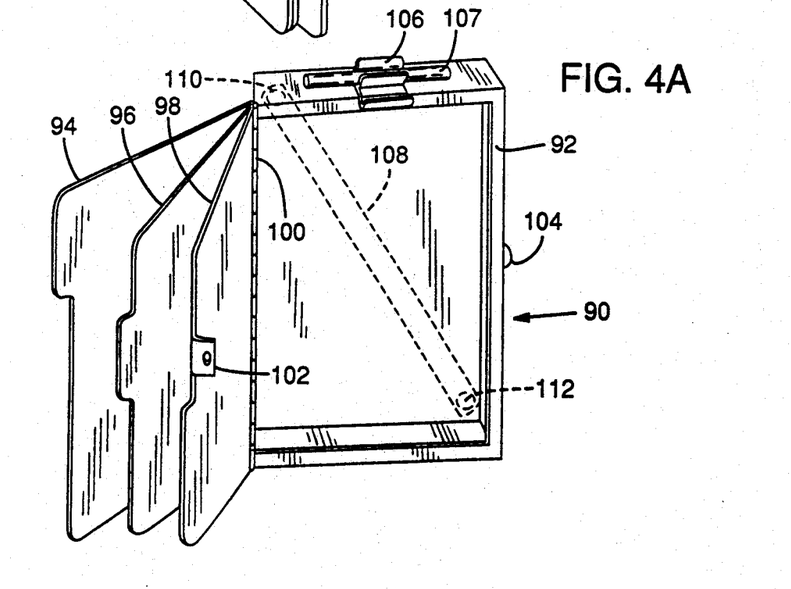
Figure 4B:
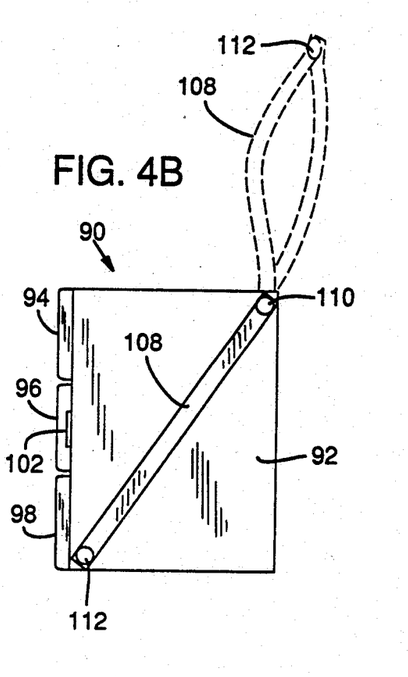
FIG. 4B is a rear view of the case of FIGS. 4 and 4A.

Refer now to FIGS. 4 and 4A of the drawings which illustrates an incident control board case 90 which may be considered (depending on the use and situation) an adjunct to, or substitute for, the case 10. It is intended to have a limited application to smaller incidents or to the beginning stages of an incident that develops into a larger incident in which event it would be replaced by a case 10. The incident control board case 90 is a portable unit preferably of lightweight material, such as aluminum. The incident control board 90 is rectangular in shape and has an open box type base 92 and has cover sheets 94, 96, and 98 hinged to an edge of the base 92 by a hinge 100. A suggested size of the base 92 is 10 inches by 13 inches by 1 inch although the size may be varied. The cavity of the base 92 provides a storage area for items that may be required such as pens, writing pads, name tags and so forth. As shown, the sheets 94, 96 and 98 are fitted to the same hinge 100. The sheet 98 provides a cover for the base 92 and as illustrated in FIG. 4A, the sheets 94 and 96 overlay the sheet 98 when all sheets are in a closed position.

The sheets 94, 96, and 98 are retained in a closed position by a combination spring clip and holder 106 provided on the end of the base 92 for securing the sheets 94, 96 and 98 in the closed position and for holding a writing tool such as an erasable marker 107. A strap 108 is fitted diagonally across the back of the base 92 and is fixedly secured to the base by a fasteners 110 and 112 such as rivets near both corners. A user may insert a hand between the strap 108 and the back of the base 92 as an aid in holding the tool 90 in position for writing or paging through the sheets 94, 96, and 98.

The case 90 (control board) is formatted with graphic displays similar to the templates 30 and 40 of the case 10 with a format provided on each side of the sheets 94, 96 and 98. The surface of each side (page) of the sheets 94, 96 and 98 are finished with a suitable material permitting the use of an erasable marker.

The front, also referred to as page 1, of the sheet 94 as shown in FIG. 4, has a clip 116 for retaining a note pad and has a finish suited for a marking pen. The front of the sheet 94 is otherwise basically blank and is used for making notations by an erasable marker directly on the sheet or in the alternative, making notes on a note pad retained by the clip 116.

Figure 5A:
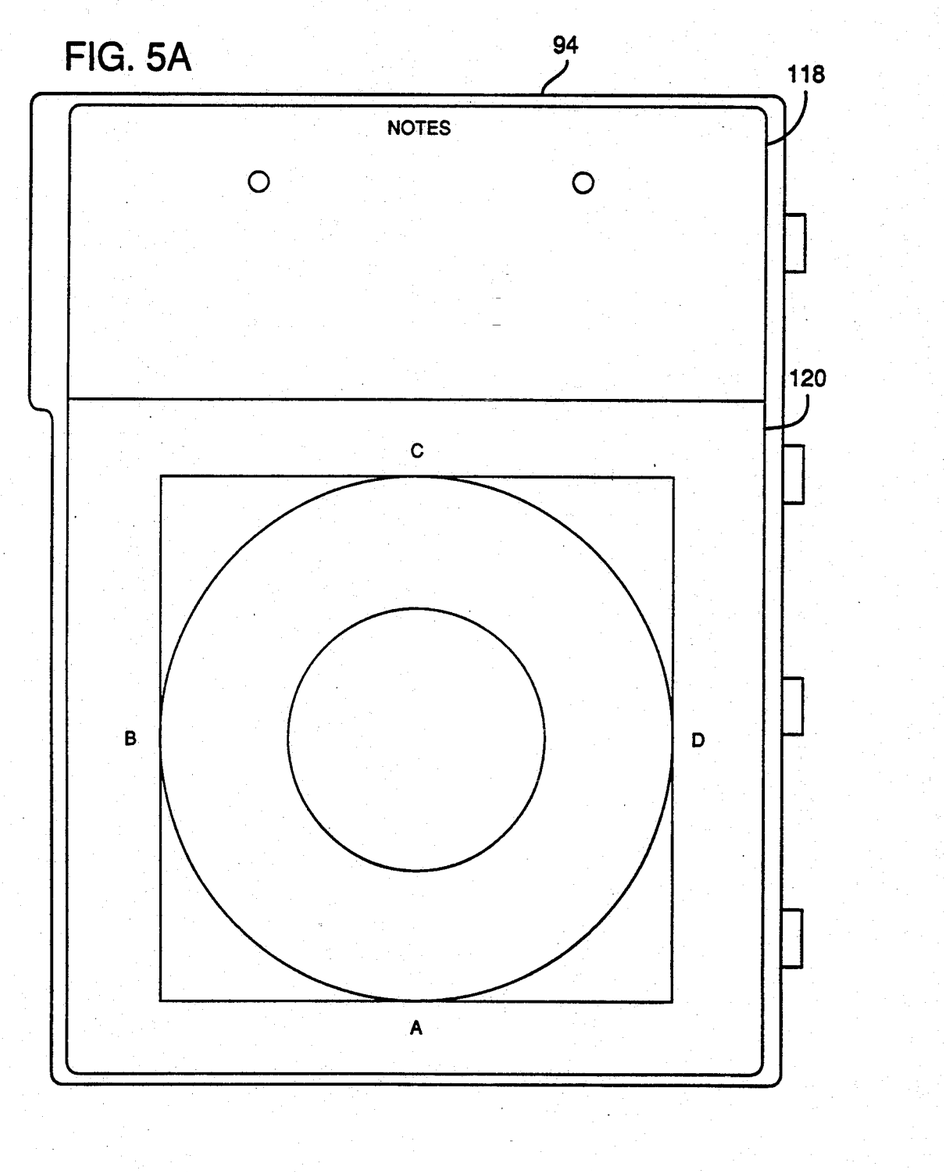
FIGS. 5A, 6, 6A and 7 are plan views of various graphic formatted sheets incorporated into the case of FIGS. 4 and 4A.

Refer now to FIG. 5A of the drawings which details the format imprinted on the rear, also referred to as page 2, of the sheet 94. The rear of the sheet 94 (page 2) has an upper graphic 118 at the top titled "Notes" and the bottom portion has a lower graphic 120 for use to reference the site location and is of the same format as the graphic 52 on the template 30 fitted to the top 14 of the case 10. The graphic 120 has a square with sides labeled A, B, C and D and also includes two concentric circles within the square.

Figure 6:
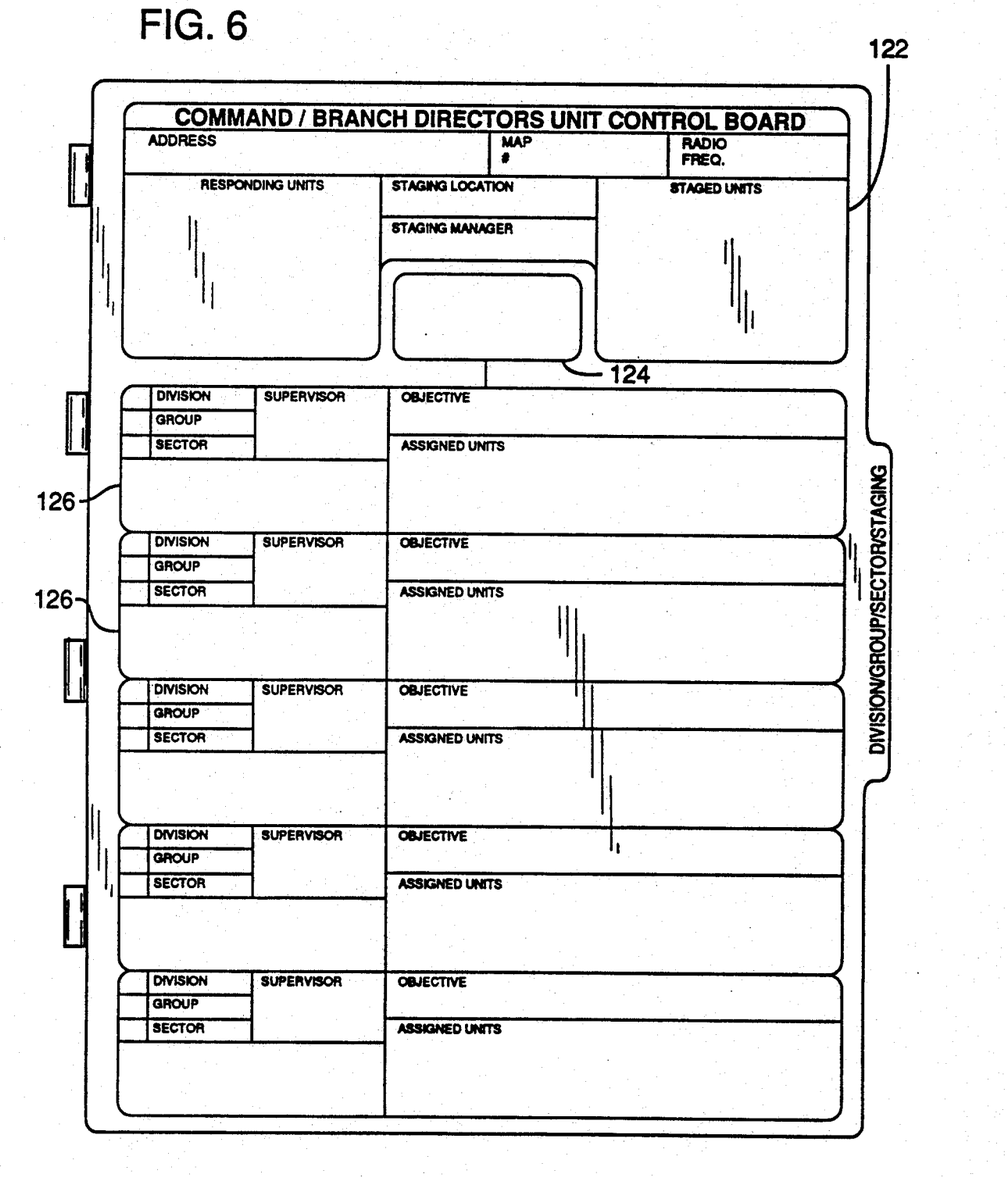
Figure 6A:
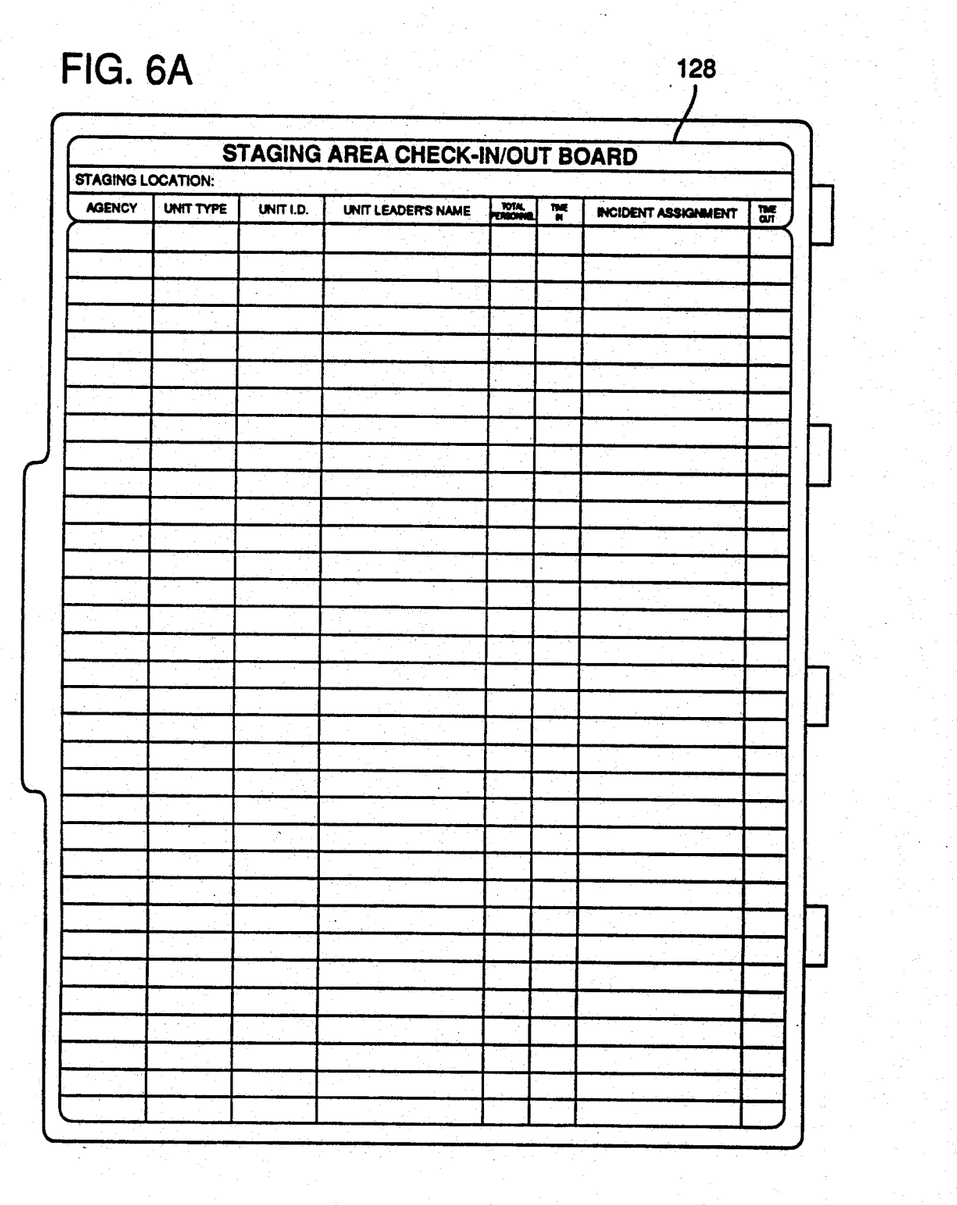

Refer now to FIGS. 6 and 6A of the drawings. These figures show the format of the front (page 3) and rear (page 4) of sheet 96. The front of the sheet 96, referred to as page 3, is titled "Command/Branch Directors Unit Control Board". Page 3 has an upper graphic 122 and a lower graphic 124. The upper graphic 122 includes the above mentioned title and has three spaces below the title which are titled "Address", "Map Number", and "Radio Freq.". The left side of the graphic 122 has an area titled "Responding Units" and the right side of the graphic has an area titled "Staged Units". Two lines are provided in the center of the graphic with one line titled "Staging Location" and the other line titled "Staging Manager". The lower graphic 124 has the same format as the branch graphic 82 on the template 40 of the tool 10. The lower graphic 124 has a space for inserting the name of the director or incident commander and the lower graphic 124 has sub graphics 126 similar to the sub graphics 84 of the template 40. The left side of the sub graphics 126 each have a space titled "Division", "Group", and "Sector" with a small box adjacent each title for checking off the appropriate designation. An area is provided adjacent the division, group and sector titles for inserting the name of the supervisor and is titled "Supervisor". A blank area is provided for naming the division, group or sector. The right side of the sub graphic 126 includes a line titled "Objective" and below the objective line a area titled "Assigned Units" is provided.

Refer now to FIG. 6A which illustrates the format of the graphic 128 on the rear of the sheet 96 (page 4). Graphic 128 is titled "Staging Area Check-In/Out Board" and includes a line below the title titled "Staging Location". The graphic 128 is divided into multiple vertical columns which are titled "Agency", Unit Type", "Unit I. D.", "Unit Leaders Name", "Total Personnel", "Time In", "Incident Assignment" and "Time Out".

Figure 7:
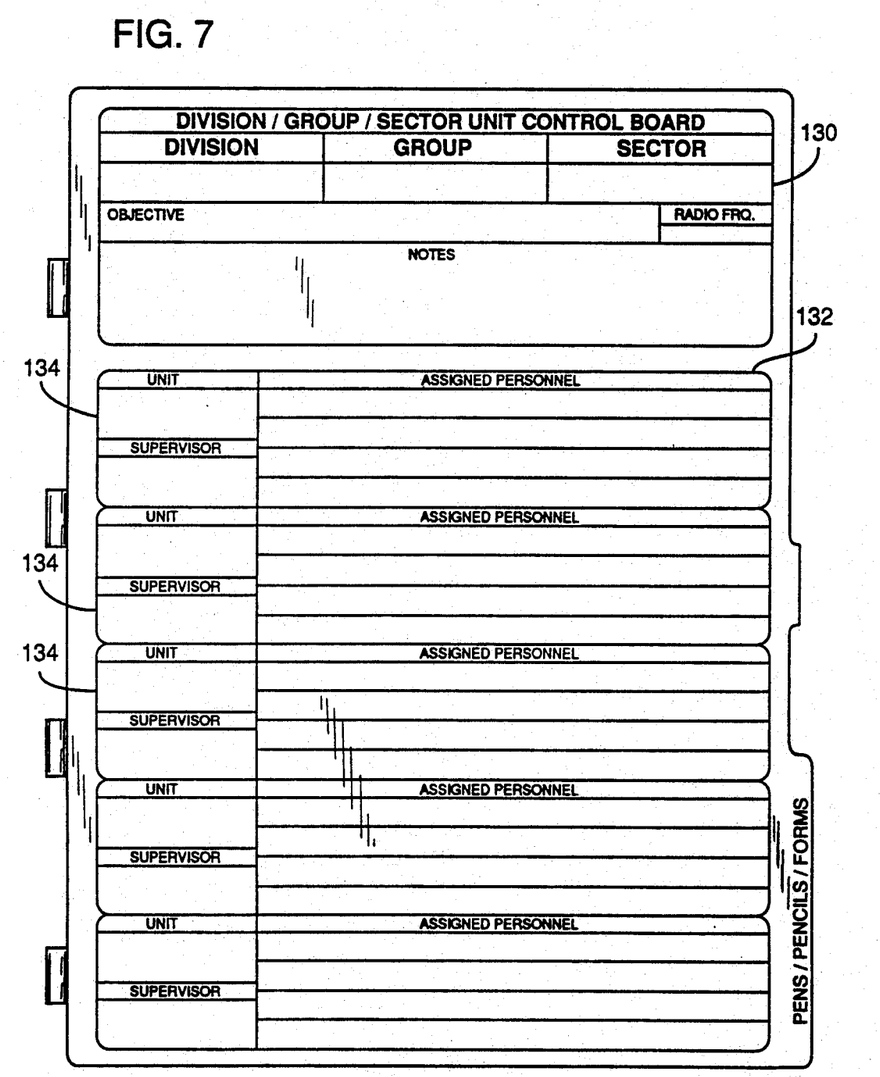

Refer now to FIG. 7 of the drawings which illustrates the format on the front of the sheet 98 (page 5). The page has two graphics with the upper graphic 130 titled " Division/Group/Sector Unit Control Board". Below the title are three columnar lines titled "Division", "Group", and "Sector". A space is provided titled "Objective" and a small block is provided titled "Radio Frq". The lower portion of the upper graphic 130 has an area titled "Notes".

The lower graphic 132 is a composite of multiple graphics 134 having blocks on the left side titled "Unit I.D." and "Supervisor". The right side of each graphic 134 adjacent the unit I.D. and supervisor blocks has an area titled "Assigned Personnel".

The rear of sheet 98 (page 6) is left blank and may be utilized for additional notes, other information or incorporation of a personnel accounting system.

The incident commander, by utilizing either case 10 or 90 has the facilities to rapidly organize, manage and direct fire fighting and other incident units. Each case 10 or 90 provides a system structured to work specifically within the nationally recognized Incident Command System (ICS) contained in the National InterAgency Incident Management System (NIIMS). The cases 10 and 90 provide the organization necessary to implement the ICS at the site of the situation.

UTILIZATION

Utilizing the control case 10 or 90 provides the incident commander with the tools to rapidly organize a line of command, establish a plan of action and deploy and track equipment units at the site. A visual record is created of task assignments, the individuals in charge of each task, units deployed for each task, and units available to be assigned.

First consider a small fire that presumably only requires one or two fire fighting units and their corresponding crews of personnel and equipment. The first officer to arrive at the scene normally assumes the role of the incident commander. It should be noted here that it is preferable that each equipment unit (and thus every potential incident commander) have a case 90. The incident commander will immediately establish a plan of action and will assign a task to his/her unit and, if applicable, the additional responding unit. By utilizing the case 90, the incident commander has the format to develop the incident organization by utilizing the graphics on pages 2 and 3 (see FIGS. 5A and 6). Page 2 provides the necessary incident check lists for command functions and incident priorities. Page 3 has the graphics for listing the address of the incident, map number and the radio frequency to be utilized. The incident commander would fill in the identity of the responding units, the staging location and the units called to the staging location (if required).

The incident commander in making assignments would insert a check mark next to the division (or group or sector if appropriate) on the graphic 124 and name a supervisor to lead that division. The supervisor would likely be the officer of the other responding unit or a member of the incident commander's own crew. A function would be listed such as "fire attack" and the assigned equipment unit numbers would be written in the appropriate place on the sub graphic 126.

It is recognized that the incident commander could in the above instance make reassignments of the personnel and equipment units without resorting to written notations. It is important also to note that in any event a record is kept of the current on site organization which is critical in the event that the incident commander is relieved of duty such as by a shift change in personnel or other reason. The individual replacing the original incident commander then has not only a record of the assignments and other details but has a record that can be instantly reviewed by scanning the pages of the case 90.

It is also important to have a record in the event the simple incident expands into a major disaster requiring many additional equipment units and corresponding personnel. The management and directing of many units and personnel can best be accomplished by utilizing the case 10 and the current organization can be quickly transferred from case 90 to a case 10. The case 10 has the more desirable format to expand the incident organization to include added section responsibilities of operations, planning, logistics and finance/risk management.

The basic line of command is, however, essentially the same for a simple incident as it is for a major disaster. The incident commander is in charge, but in a major disaster, the incident commander requires additional levels of organization and support personnel to maintain an effective span of control (5 to 1 ratio). This will allow the incident commander to effectively manage and direct all of the personnel and equipment involved as well as communicating with cooperating agencies such a police departments, ambulance services and others. The case 10 has the format to more readily record all such assignments and directives and provides the capability to instantly and visually determine the actions taking place.

As seen in FIG. 2, the resource template 30 provides the incident commander a detailed inventory of the resources available. As a resource unit is called to duty, be it a specialized crew or an equipment unit, its identity is placed on the staging area graphic 70 on the template 40 (FIG. 3). The identity may be written in or preferably is identified by a magnetic tag having the identifying logo of the resource unit engraved on it.

The resource template 30 also has titled spaces for inserting the incident identification, the command post location and the radio network or frequencies. The graphic 58 is utilized to reference the sides of a building or an area and as previously mentioned is suited for the overlay of an actual map of the site.

The action template 40 (see FIG. 3) provides the facilities for listing all of the assignments of personnel and equipment units required in the chain of command to carry out the necessary tasks as required by the situation at the site. The name of the incident commander would be shown in the command graphic 74. The incident commander will appoint personnel to the various positions as dictated by the need. The action template 40 as shown in FIG. 3 has the format of graphics required for the most severe of conditions. Only those graphics required for a situation would of course be utilized.

As an example, a fire in a multiple story building may require the services of the police department and ambulance service in addition to the fire department. The incident commander could assign a director to a branch (graphic 82) and name that branch an appropriate name such as fire. The director of the branch will determine what tasks are to be accomplished and will assign a supervisor for each task. For example, one job may be "fire attack". One of the sub graphics 84 will be utilized for this job and the supervisors name will be placed in the graphic and title fire attack will be written in the block provided under the supervisors name. The identifying tags of the units assigned will be moved from the staging area graphic to the sub graphic 84 titled fire attack. Another job may be to ventilate floor three. Another sub graphic under the branch name fire would be utilized to list the supervisor and the assigned units. Thus for each distinct task a separate sub graphic 84 is utilized.

A separate branch, utilizing another graphic 82 and named for example "police", would be utilized to establish a line of command with the police department. A director would be assigned to this branch and specific jobs would be listed in the sub graphics 84 with personnel and units assigned as required.

Another branch could be established for ambulance service and so forth. As can be seen, each and every facet of the incident organization may be accomplished within the arrangement of the graphic displays of the case 10.

Figure 1A:
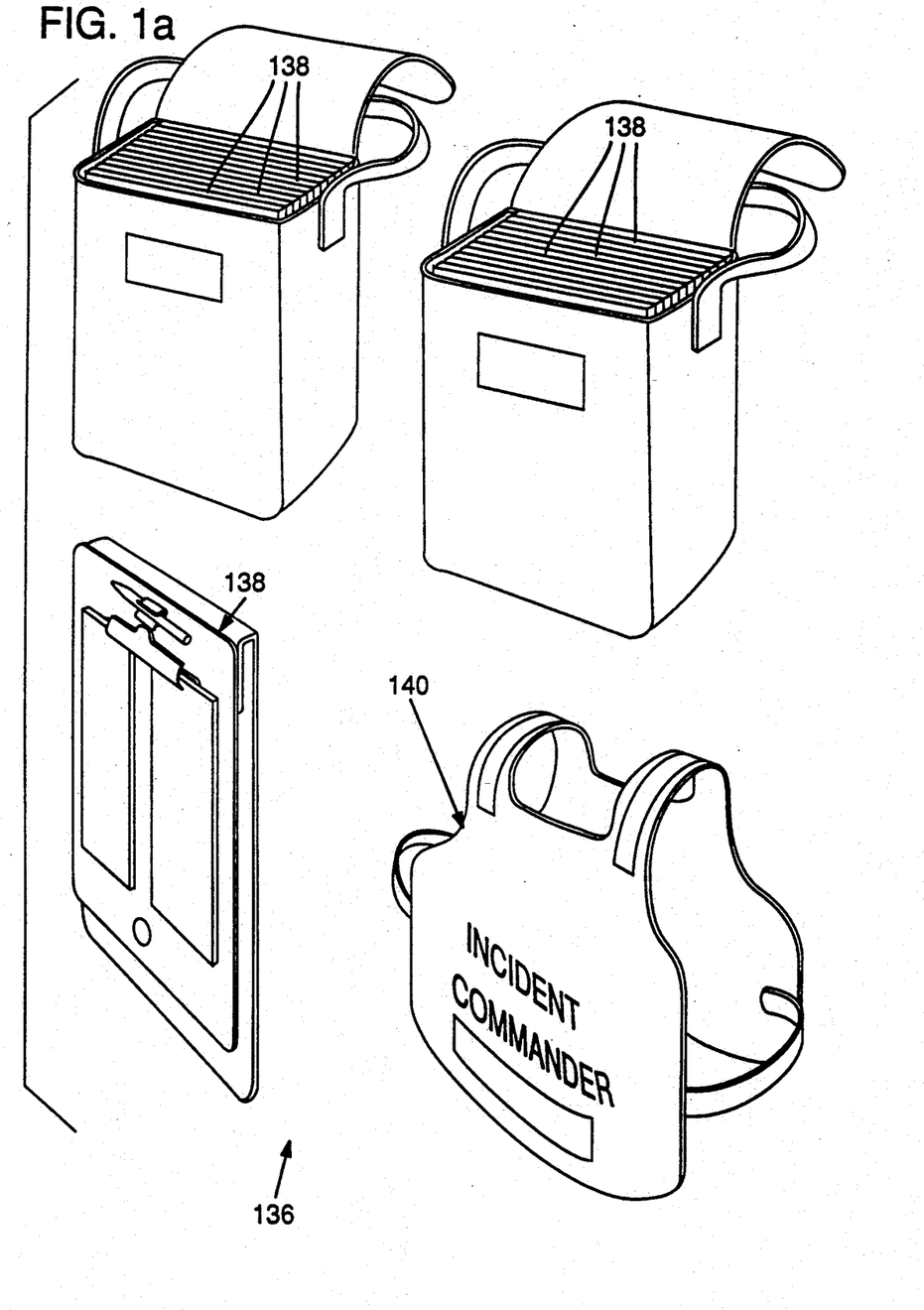
FIG. 1A is a supplemental support kit for organizing incident support functions.

Not mentioned above but a further tool that supplements the control cases 10 or 90 are the kits 136 illustrated in FIG. 1A. A workbook 138 from the kit 136 is provided for each functional area, e.g., staging, logistics, fire branch, medical branch, etc. Each workbook is color coded and includes reflective identification vests 140, an organizational guide, note pad, pen and storage compartment for forms, etc. (the latter not being illustrated but understandably contained in the workbook 138). Managers of these functional assignments are provided with the kits which contain a sufficient supply of materials to accomplish the task.

Those skilled in the art will readily recognize that the embodiments disclosed may be utilized from the simplest to the most complex incident situation. The management team, with the tools herein disclosed have the capability of efficiently managing and directing many units of personnel and related equipment.

Those skilled in the art will readily recognize that modifications and variations may be made to suit the user. The rear of sheet 98, which in our embodiment is basically blank may, for example, be utilized to track units and keep track of individual personnel assigned to an incident. The back of the sheet 98 (page 6) could be imprinted with a graphic and have holding means for holding passes for each unit. The pass for each unit would have the unit identification and the personnel assigned to the unit. The personnel may be identified either by individual tags or by writing in the names. When a shift change occurs, for example, the unit itself stays, but the personnel assigned to the unit are relieved by replacement personnel. The original pass for the unit is either replaced with an updated pass with the new personnel or the original pass is updated with the listing of the new personnel. In this manner, all of the personnel may be readily accounted for. This is but one example and other changes or modifications can readily made to suit the requirements.

Whereas the embodiments illustrate the preferred form of the invention, those skilled in the art will likely conceive of numerous other variations and modifications which are nevertheless encompassed within the definition of the invention as set forth in the claims appended hereto.

What is claimed is:

1. For a hazard incident management and control operation wherein a geographic region is provided with incident control units previously organized under a central control and available for assignment to incidents having varying degrees of control unit needs, a control tool to be used by an incident commander of said operation for organizing, deploying, and managing incident control units assigned to said operations, comprising;
   a plurality of indicia items individually dedicated to the identification of an incident control unit and collectively identifying the control units available within a specified region of control;
   a plurality of graphic displays cooperatively arranged and organized for utilization by the incident commander to record the ongoing organization established over a hazard incident;
   a first graphic display of said plurality of graphic displays formatted to receive said plurality of indicia items and thereby providing a listing of potentially available control units for an incident;
   a second graphic display of said plurality of graphic displays formatted to receive selected ones of said indicia items representing a listing of resources assigned to an incident commander;
   a third graphic display of said plurality of graphic displays having a listing of incident control functions and formatted to receive selected ones of said assigned indicia items representing incident control units assigned to those functions;
   means providing removable attachment of said indicia items to said graphic displays whereby the resource identifying indicia can be moved from said first graphic display to the second upon assignment of a unit to an incident commander, and then to said third graphic display upon assignment thereof by the incident commander to a incident control function; and
   portable means containing and storing said graphic displays and indicia items for transport to the site of said operation, and display means for displaying said graphic displays and indicia items for use by the incident commander at the site.

2. A control tool as defined in claim 1 wherein said portable means and said display means is a carrying case, and said graphic displays are provided on templates attached inside said case.

3. A control tool as defined in claim 2 wherein said indicia items are magnetized tags, and said templates are of a material that is magnetically attracted to said tags.

4. A control tool as defined in claim 3 wherein said templates have a surface on which information can be erasably written and a writing implement for providing informational notations on said graphic displays of said templates.

5. A control tool as defined in claim 2 wherein one of said graphic displays represents a targeted structure at the operation site, and means for recording information on the graphic display pertinent to said structure.

6. A control tool as defined in claim 1 wherein said plurality of graphic displays additionally includes;
a plurality of function control graphic displays formatted for individual incident control functions for organizing supervised control over each said incident control function, and command control graphic displays to identify the chain of command over such functions.

7. A control tool as defined in claim 5 including a first carrying case adapted to be carried by a commander while moving about said site, said graphic displays provided on templates pivotally attached to the case, and handle means attached to said case for carrying said case, said first carrying case suitable for control by a supervisor of a incident control function, and a second carrying case having top and bottom covers adapted to be set up at a position of central command, said graphic displays provided on the inside of the case covers for simultaneous display of all of the graphic displays covering all of the operations being engaged in at the site.

8. A control tool as defined in claim 7 including a kit, workbooks in said kit having supplemental tools for function supervisors, said tools including color coded vests, field operations guide, note pad and pencil.

9. For an incident management and control operation, a control tool to be used by an incident commander of said operation for organizing, deploying, and managing incident control units assigned to said operations, comprising;
a plurality of indicia items each identifying a incident control unit available within a specified region of control;
a plurality of graphic displays cooperatively arranged and organized for utilization by the incident commander;
a first graphic display of said plurality of graphic displays formatted as a listing of potentially available resources;
a second graphic display of said plurality of graphic displays formatted as a listing of resources assigned to the operation;
a third graphic display including a plurality of function control graphic displays formatted for individual control functions for organizing supervised control over each said incident control function; and
a fourth graphic display including command control graphic displays to identify the chain of command over such function;
means providing removable attachment of said indicia items to said graphic displays whereby the resource identifying indicia can be moved from said first graphic display to the second upon availability of a unit to the incident control operation, and then to said third graphic display upon assignment thereof by the incident commander to a incident control area;
portable means containing and storing said graphic displays and indicia items for transport to the site of said operation, and display means for displaying said graphic displays and indicia items for use by a commander at the site; and
a first carrying case adapted to be carried by a commander while moving about said site, said graphic displays provided on templates pivotally attached to the case, and handle means attached to said case for carrying said case, said first carrying case suitable for control by a supervisor of a incident control function, and a second carrying case having top and bottom covers adapted to be set up at a position of central command, said graphic displays provided on the inside of the case covers for simultaneous display of all of the graphic displays covering all of the operations being engaged in at the site.

* * * * *